United States Patent [19]

Marshall

[11] Patent Number: 5,738,356
[45] Date of Patent: Apr. 14, 1998

[54] SHAFT SUPPORT STRUCTURE FOR TURBOMACHINE

[76] Inventor: Dale Fred Marshall, R.D. 2 Box 73F1, Friendship, N.Y. 14739

[21] Appl. No.: 647,045

[22] Filed: May 9, 1996

[51] Int. Cl.⁶ ............................................. F16J 15/16
[52] U.S. Cl. ..................... 277/27; 277/75; 277/173; 384/99; 384/311
[58] Field of Search .................................. 277/3, 27, 73, 277/75, 77, 173; 384/99, 309, 311

[56] References Cited

U.S. PATENT DOCUMENTS

| | | | |
|---|---|---|---|
| 3,756,673 | 9/1973 | Strub | 384/117 |
| 3,912,342 | 10/1975 | Schirm et al. | 308/36.3 |
| 3,915,459 | 10/1975 | Kunderman | 277/27 |
| 4,012,085 | 3/1977 | Kunderman | 308/26 |
| 4,027,931 | 6/1977 | Streifert | 308/15 |
| 4,133,541 | 1/1979 | Kirk | 277/65 |
| 4,783,179 | 11/1988 | Katayama et al. | 384/130 |
| 4,952,076 | 8/1990 | Wiley, III et al. | 384/99 |
| 5,048,978 | 9/1991 | Singh | 384/99 |
| 5,056,935 | 10/1991 | Singh | 384/99 |
| 5,085,521 | 2/1992 | Singh | 384/99 |
| 5,215,384 | 6/1993 | Maier | 384/99 |
| 5,403,019 | 4/1995 | Marshall | 277/27 |

*Primary Examiner*—Daniel G. DePumpo

[57] ABSTRACT

The support structure for a rotatable shaft of a turbomachine includes tilt pad bearings mounted within an outboard seal ring so that the tilt pad bearings urge the outboard seal ring to be concentric with the shaft. A squeeze film damper acts between the outboard seal ring and the wall of a housing cavity in which the outboard seal ring is mounted, to center the outboard seal ring within the housing cavity. The squeeze film damper chamber is defined by two O-rings positioned in two annular grooves eccentrically formed in the outboard seal ring. A high pressure lubricant is delivered to a high pressure chamber to which the smaller inboard end surface of the outboard seal ring is exposed, while a lower pressure lubricant is delivered to an intermediate pressure chamber to which the larger outboard end surface of the outboard seal ring is exposed, for pressure-balancing the outboard seal ring axially. A flow limiter is provided in the lubricant delivery line to the intermediate pressure chamber, and a leakage pathway is provided between the intermediate pressure chamber and the outboard end of the shaft, so that the pressure in the intermediate pressure chamber is determined by axial movement of the outboard seal ring. High pressure lubricant is also delivered to the fluid film damper.

23 Claims, 5 Drawing Sheets

SHAFT SUPPORT STRUCTURE FOR TURBOMACHINE

FIELD OF THE INVENTION

This invention relates generally to a support structure for rotatably supporting a shaft in a turbomachine. In a specific aspect, the invention relates to a shaft support and seal structure, including tilt pad bearing shoes and squeeze film elements for supporting the shaft and for dampening vibration of the shaft during high speed rotation.

BACKGROUND OF THE INVENTION

A turbomachine having a rotating shaft must provide some means for supporting the shaft while the shaft is rotating as well as some means for providing a seal for the high pressure process fluid in the turbomachine. A general practice is to provide a journal bearing adjacent each end of the shaft to support the shaft, and to position a seal adjacent to and inboard of each bearing to minimize leakage of the high pressure process fluid. While a sleeve bearing is effective for supporting a shaft, it can introduce oil whirl in the oil film which forms between the sleeve bearing and the shaft, and it cannot provide optimum stiffness and damping coefficients to minimize vibration of the shaft. Also, as the inner diameter of the sleeve has to be sufficiently larger than the shaft to accommodate lateral movement of the shaft during rotation, a sleeve bearing would allow excessive oil loss if used as a seal. One of the most effective bearings for avoiding the oil whirl problem and optimizing stiffness and damping coefficients is the pad type bearing which employs a plurality of tilt pad bearings which are spaced apart from each other about the circumference of the bearing. However, as the tilt pad bearings are generally employed with substantial spaces between adjacent tilt pad bearings, it has generally been necessary to provide a separate seal structure.

Figure 1:
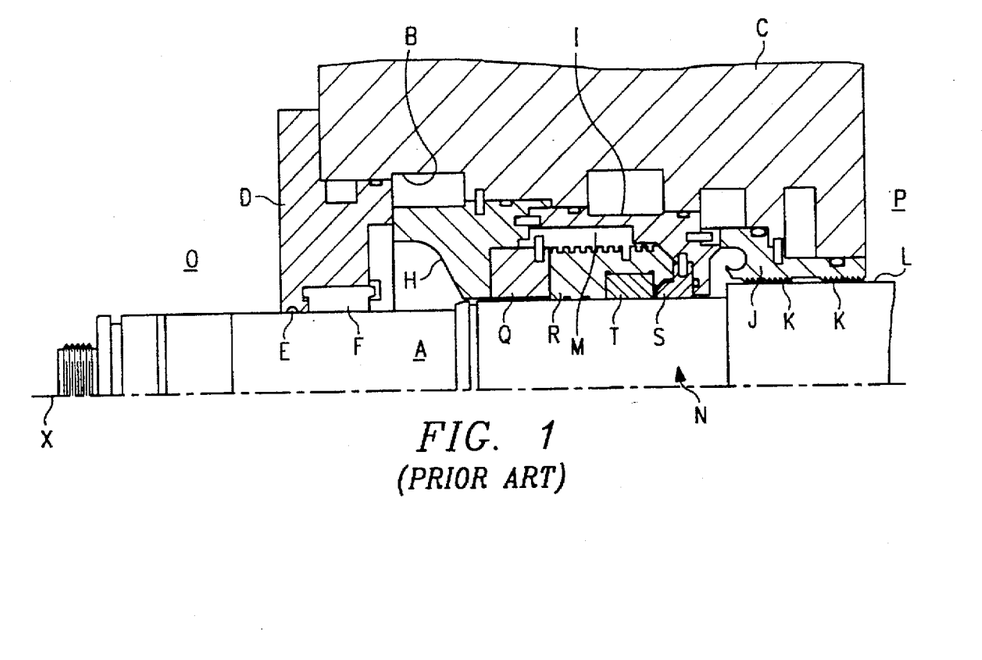
FIG. 1 depicts a portion of a prior art turbomachine, including a bearing support and an inboard seal structure for one end of the rotatable shaft of the turbomachine, viewed as a radial cross section in a plane which includes the longitudinal axis of the rotatable shaft.

One prior art arrangement for supporting and sealing a rotatable shaft of a turbomachine is shown in FIG. 1, which depicts a radial cross-sectional view in a plane which includes the longitudinal axis X of the rotatable shaft A. The rotatable shaft A of the turbomachine is mounted within a larger bore B which extends through the casing C. The outboard end of the annular space between the shaft A and the casing C is substantially closed by the outboard annular housing element D. One end of the shaft A is rotatably supported within the bore E of the annular housing element D by an outboard journal bearing F, which can be a plurality of tilt pads. Axially inwardly of the outboard housing element D are inner annular housing elements H and I, and axially inwardly of the inner annular housing element I is an annular gas seal member J having at least one labyrinth surface K located on the inner surface of the seal member J and adjacent a seal surface L on the shaft A. The inner housing elements H and I provide an annular cavity M in which a seal structure N is mounted around the shaft A. Thus, the seal structure N is positioned between the gas seal member J and the outboard journal bearing F. The seal structure N includes a spacer Q, an outer seal ring R, an inner seal ring S, and a plurality of tilt pad shoes T spaced apart circumferentially around the shaft A. The outboard journal bearing F supports the shaft A, while the seal structure N and the labyrinth surfaces K provide sealing resistance to the flow of high pressure process fluid from the high pressure area P along the shaft A to the outside atmosphere O. The support and seal structure at the opposite end of the shaft A can be a mirror image of that illustrated in FIG. 1.

A structural arrangement for providing a seal around the rotatable shaft of a turbomachine, while permitting lateral movement of the shaft, is disclosed by Albert C. Schirm and Fred K. Kunderman in U.S. Pat. No. 3,912,342. In that patent, the stiffness of the shaft, which is journaled in the housing by a non-illustrated journal bearing, is controlled by the use of high fluid pressure in a cavity in the housing. The high fluid pressure acts against opposite ends of an annular seal body containing a plurality of bearing shoes spaced apart from each other about the inner circumference of the seal body. The relative areas of the opposite ends of the seal body are determinative of the force with which an annular seal surface on the outboard end of the seal body frictionally and sealingly engages the adjacent axial endwall of the cavity. This, in turn, determines the resistance to the radial movement of the shaft. The seal body has an inner annular sealing surface adjacent to the shaft which cooperates with the shaft to prevent fluid flow between the sealing surface and the shaft. The bearing shoes, which are located in a counterbore in the inboard end of the seal body, are movably attached to the seal body and have an arcuate inner surface arranged to slidingly mate with the shaft to maintain the sealing surface of the seal body concentric with the shaft.

Two structures for compensating for the weight of a shaft and rotor assembly in a turbomachine, while damping vibrations that occur in the rotating shaft, are described by Fred K. Kunderman in U.S. Pat. No. 4,012,085. In the first illustrated structure, the shaft and rotor assembly is journaled in a bearing sleeve which is supported in a bore in the turbomachine housing. The bearing has a central bore that is only slightly larger than the outside of the shaft so that an oil film is formed between the interior surface of the bearing bore and the external surface of the shaft, with the oil film functioning both as a seal and a lubricant. In the second illustrated structure, an annular sleeve is positioned in a bore in a turbomachine housing, with the central bore of the annular sleeve being substantially greater than the diameter of the shaft, so that a plurality of circumferentially spaced rocker shoes can be pivotably mounted on the interior of the annular sleeve for engagement with the external surface of the shaft for centering the annular sleeve with respect to the shaft. Each rocker shoe has an inner arcuate surface which mates with the shaft so as to permit an oil film to be present therebetween. In each of these structures, the sleeve is supported in the housing by an O-ring which is positioned in an annular groove in the housing, with the groove being formed eccentrically to the housing bore, in order to center the weight of the shaft and bearings within the housing bore. The bottom portion of the annular groove is shallower than the top portion so that extra material from the O-ring is utilized in supporting the bearing and shaft against the force of gravity.

Singh, U.S. Pat. No. 5,048,987, discloses a turbomachine having a shaft damper bearing, which utilizes spaced apart piston ring seals to seal off an annular squeeze film space between the rings, wherein the squeeze film damper seal includes two axially spaced grooves in the housing, each groove being concentric with a bearing support undergoing radial motion and containing a piston ring seal adapted to engage the bearing support. A damper fluid such as pressurized oil is introduced into the annular squeeze film space, such that lateral motion of the bearing support exerts a compressive or squeezing force on the oil in the annular squeeze film space, thereby generating a damping resistance to vibratory motion of the bearing support.

The use of both a journal bearing and an axially spaced seal structure requires a significant axial length, thereby requiring a large structural configuration for the turbomachine. The journal bearings require oil and most seal designs require oil, resulting in an undesirable high level of oil consumption.

SUMMARY OF THE INVENTION

An object of the present invention is to provide a combined bearing support and seal arrangement which effectively controls the leakage of lubricant oil to the outside of the bearing support and seal arrangement to an acceptable minimum. Another object of the invention is to provide a combined bearing support and seal arrangement which is sufficiently rigid to provide the only support for one end of the shaft of the turbomachine, thus eliminating the need for a separate bearing system outboard of the seal.

In accordance with the present invention, a structure for controlling the flow of lubricant from a high pressure source on the inboard end of an outboard seal ring to a lower pressure within an intermediate pressure chamber at the outboard end of the outboard seal ring is provided so that the outboard seal ring is balanced axially within the turbomachine housing and is free to float radially with the shaft. A bearing is positioned within the outboard seal ring to maintain the outboard seal ring concentric with the shaft. A pair of annular resilient members are positioned between the housing and the exterior surface of the outboard seal ring, with each resilient member being in an annular groove which is eccentric to the central bore of the outboard seal ring such that there is a greater amount of the resilient material protruding out of the grooves below the shaft than above the shaft, thereby providing support for the weight of the shaft. Pressurized lubricant is provided in the space between the two resilient members, thereby providing a squeeze film damper for damping lateral movement of the outboard seal ring.

In a presently preferred embodiment, the bearing comprises a plurality of tilt pads, each of the tilt pads having an inner arcuate surface, each of the tilt pads being positioned in an annular chamber within and loosely connected to the outboard annular seal ring, whereby the inner arcuate surface of each of the tilt pads can engage the shaft so as to tend to maintain the outboard annular seal ring at least substantially coaxial with the shaft.

The foregoing and other objects and advantages of the present invention will become more apparent from the following description of the best mode for carrying out the invention when taken in conjunction with the accompanying drawings.

DETAILED DESCRIPTION

Figure 2:
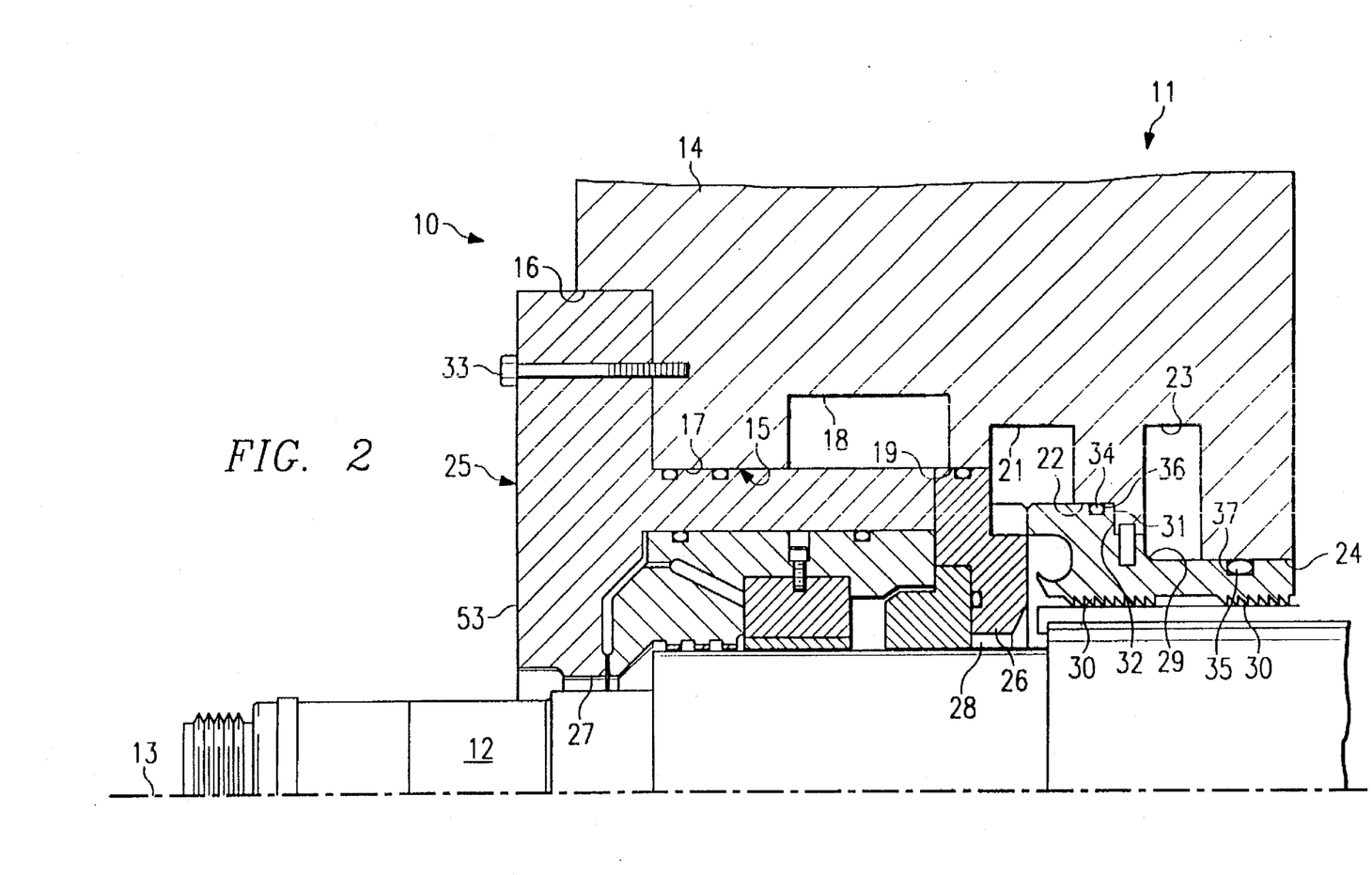
FIG. 2 depicts a portion of a turbomachine, including a combined bearing support and seal structure assembly for one end of the rotatable shaft of the turbomachine, constructed in accordance with a first embodiment of the present invention, viewed as a radial cross section in a plane which includes the longitudinal axis of the rotatable shaft.
Figure 3:
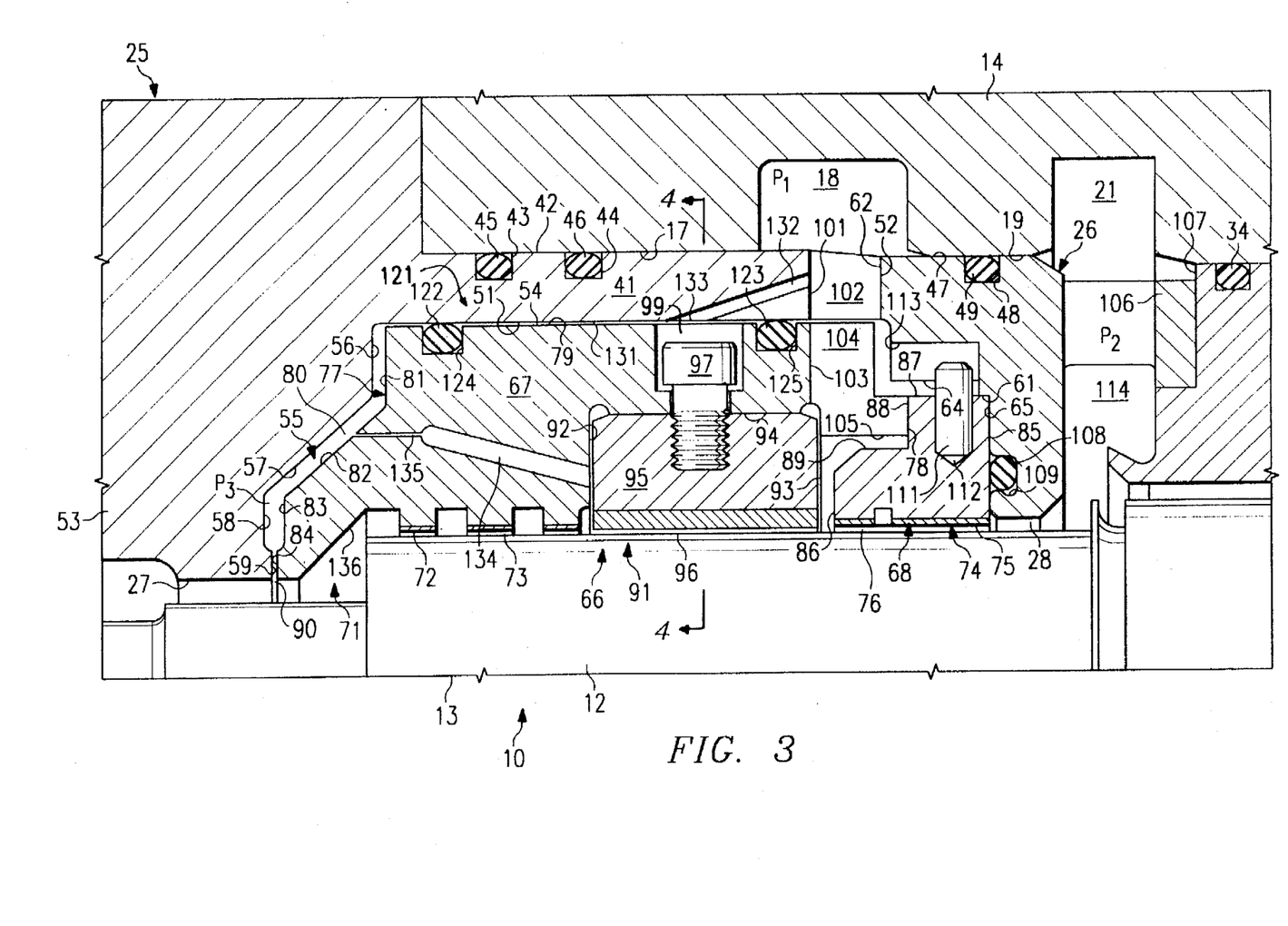
FIG. 3 is an enlarged view of a portion of FIG. 2, showing in greater detail the combined bearing support and seal structure assembly.

Referring to FIGS. 2 and 3, the combined bearing support and seal structure assembly 10 is particularly constructed for use in a turbomachine 11 having a rotatable shaft 12, e.g., a compressor. Each of FIGS. 2 and 3 depicts only the portion of the turbomachine 11 which includes the combined bearing support and seal structure assembly 10 for one end of the rotatable shaft 12 of the turbomachine 11, and then only the portion in a plane containing and extending radially upwardly from the longitudinal axis 13 of the rotatable shaft 12. As most of the elements are annular, the view of the portion in the plane extending radially downwardly from the longitudinal axis 13 would be at least substantially the same as illustrated in these figures except rotated 180° about the longitudinal axis 13. Unless otherwise stated, radial directions are directions which are radial to the longitudinal axis 13 of the shaft 12, and longitudinal directions are parallel to the longitudinal axis 13 of the shaft 12.

The turbomachine 11 includes a casing 14 having a staggered or stepped diameter bore 15 extending therethrough. In the illustrated embodiment, the casing bore 15 comprises a series of annular grooves 16, 18, 21, and 23 alternating with a series of annular lands 17, 19, 22, and 24, wherein each annular land has an inner radius (from the longitudinal axis 13) which is less than the inner radius (from the longitudinal axis 13) of the annular groove on either side of that land. The stepped casing bore 15 is sized to receive the outboard annular housing element 25 and the inboard annular housing element 26 of the support bearing and seal assembly 10. The casing 14, the outboard annular housing element 25, and the inboard annular housing element 26 represent components which are secured together to form the turbomachine housing. The shaft 12 is rotatably mounted within the housing bore represented by the centrally located bores 27 and 28 of the housing elements 25 and 26, so that the longitudinal axis 13 of the shaft 12 is at least generally parallel to, and preferably coaxial with, the longitudinal axis of the casing bore 15 and each of the housing bore segments 27 and 28. One or more impellers (not shown) can be mounted on an intermediate portion of the shaft 12 which would be located to the right of FIG. 2.

The annular gas seal member 29, having annular labyrinth surfaces 30 located on the inner annular surface of the seal member 29 adjacent the external surface of the shaft 12, is positioned in the stepped casing bore 15 inboard of the inboard housing element 26. The outboard end of the gas seal member 29 has a greater radius than the inboard end of the gas seal member 29, thereby forming a radially extending annular shoulder 31 facing axially inwardly, which mates with an outwardly facing radially extending annular shoulder 32 formed in the annular land 22.

The outboard annular housing element 25 can be bolted to the casing 14 by a plurality of bolts 33, thereby securing the inboard housing element 26 and the gas seal member 29 between the outboard housing element 25 and the annular shoulder 32, and thus fixing the annular housing element 25 against rotation relative to the shaft 12. The inboard annular housing element 26 also is held against rotation by suitable means, e.g., a pin (not shown) extending radially between the inboard annular housing element 26 and the casing 14.

O-rings 34 and 35 can be positioned in annular grooves 36 and 37 which are spaced apart from each other in the outer surfaces of the gas seal member 29 so as to provide a fluid seal between the gas seal member 29 and the casing 14.

Referring to FIG. 3, the outboard annular housing element 25 includes an inboard reduced diameter portion 41 which extends longitudinally inwardly along the inner surface of the land 17 and part of the way across the annular groove 18. The portion 41 has an outer circumferential surface 42, which has annular grooves 43 and 44 formed therein. O-rings 45 and 46 are positioned in the annular grooves 43 and 44 so as to engage the inner surface of land 17 and thereby provide a seal between the outboard housing element 25 and the land 17 of the casing 14. The annular inboard housing element 26 extends longitudinally along a portion of the groove 18, the land 19, and the groove 21. The annular inboard housing element 26 has an outer circumferential surface 47, which has an annular groove 48 formed therein. An O-ring 49 is positioned in the annular groove 48 so as to engage the inner surface of land 19 and thereby provide a seal between the inboard housing element 26 and the land 19 of the casing 14.

The outboard housing element 25 has an inwardly opening annular cavity 51 formed in the inner portion thereof so as to encircle the housing bore 27 while being open to the housing bore 27, with the cavity 51 extending longitudinally outwardly from the inboard end 52 of the outboard housing element 25 to a location short of the outboard end portion 53 of the outboard housing element 25. The cavity 51 is defined by a longitudinally extending annular sidewall surface 54 which extends generally longitudinally from an outer portion of an outboard endwall 55 to an outer portion of an inboard end which is axially spaced from the outboard endwall 55. The inboard end of the cavity 51 is open, while the outboard endwall 55 of the cavity 51 comprises a first annular endwall surface 56 extending generally radially inwardly from the longitudinal surface 54, a second annular endwall surface 57 which extends generally inwardly and outboardly from the inner edge of the first annular endwall surface 56, a third annular endwall surface 58 extending generally radially inwardly from the inner edge of the second annular endwall surface 57, and an annular land 59 extending radially inwardly from the inner end of the third endwall surface 58 to the bore 27 of the outboard housing element 25.

The inboard housing element 26 has an inwardly opening annular cavity 61 formed in the inner portion thereof so as to encircle the housing bore 28 while being open to the housing bore 28. The annular cavity 61 extends longitudinally outwardly from an intermediate portion of the inboard housing element 26 to the outboard end 62 of the inboard housing element 26. The cavity 61 is defined by a longitudinally extending annular surface 64, an outboard end, and an inboard end 65. The outboard end of the cavity 61 is open, while the inboard end 65 of the cavity 61 extends radially inwardly from the inboard end of the longitudinally extending annular surface 64 to the housing bore 28 of the inboard housing element 26.

The annular cavity 51 in the outboard annular housing element 25 and the annular cavity 61 in the inboard annular housing element 26 constitute a collective annular housing cavity 66. The annular housing cavity 66 is sized to receive the support bearing and seal assembly 10. The support bearing and seal assembly 10 includes an outboard annular seal ring 67 and an inboard annular seal ring 68, with the inboard seal ring 68 being axially inboard of the outboard seal ring 67.

As shown in FIG. 3, the outboard annular seal ring 67 is mounted within the annular cavity 51, with the longitudinal axis of the outboard seal ring 67 being generally parallel to, and preferably coaxial with, the longitudinal axis of the housing bore 27 and the shaft 12, while the inboard annular seal ring 68 is mounted within the annular cavity 61, with the longitudinal axis of the inboard seal ring 68 being parallel to, and preferably coaxial with, the longitudinal axis of the housing bore 28 and the shaft 12. The outboard seal ring 67 is fixed by suitable means, e.g., a radially extending pin (not shown), to the outboard annular housing element 25, while the inboard seal ring 68 is similarly fixed to the inboard annular housing element 26, so that neither of the seal rings 67 and 68 can rotate with respect to the casing 14.

The outboard seal ring 67 includes a stepped central bore 71 formed therein extending therethrough along the longitudinal axis of the outboard seal ring 67, with the longitudinal axis of the central bore 71 being parallel to, and preferably coaxial with, the longitudinal axis of the outboard housing element 25. The central bore 71 is sized to rotatably receive the shaft 12 with the longitudinal axis 13 of the shaft 12 being at least substantially coaxial with the longitudinal axis of the central bore 71, and with the steps in the central bore 71 corresponding to steps in the diameter of the shaft 12. A portion of the longitudinally extending sidewall of the central bore 71 defines an annular longitudinally extending sealing surface 72 located adjacent the exterior surface of the shaft 12 so as to define an annular lubricant pathway 73 between the annular sealing surface 72 and the radially adjacent portion of the shaft 12.

Similarly, the inboard seal ring 68 includes a central bore 74 extending therethrough along the longitudinal axis of the inboard seal ring 68, with the longitudinal axis of the central bore 74 being parallel to, and preferably coaxial with, the longitudinal axis of the inboard housing element 26. The central bore 74 is also sized to rotatably receive the shaft 12 with the longitudinal axis 13 of the shaft 12 being at least substantially coaxial with the longitudinal axis of the central bore 74. A portion of the longitudinally extending sidewall of the central bore 74 defines an annular longitudinally extending sealing surface 75 located adjacent the exterior surface of the shaft 12 so as to define an annular lubricant pathway 76 between the annular sealing surface 75 and the radially adjacent portion of the shaft 12.

The outboard seal ring 67 has an outboard axial end 77 located adjacent to the outboard endwall 55 of cavity 51, an inboard axial end 78 adjacent to the inboard seal ring 68, and an outer annular surface 79 extending generally longitudinally between an outer portion of the outboard axial end 77 and an outer portion of the inboard axial end 78, with the outer annular surface 79 being positioned adjacent to the annular sidewall surface 54 of the cavity 51. The outboard axial end 77 comprises a first annular endwall surface 81 extending generally radially inwardly from the longitudinal surface 79, a second annular endwall surface 82 which extends generally inwardly and outboardly from the inner edge of the first annular endwall surface 81, a third annular endwall surface 83 extending generally radially inwardly from the inner edge of the second annular endwall surface 82, and an annular land 84 extending radially inwardly from the inner end of the third endwall surface 83 to the bore 71 of the outboard seal element 67. The endwall surfaces 81, 82, and 83 of the outboard seal ring 67 face toward and are at least generally parallel to the endwall surfaces 56, 57, and 58, respectively, of the outboard endwall 55 of the cavity 51. The axial thicknesses of the annular lands 59 and 84 are such that the endwall surfaces 81, 82, and 83 are spaced from the corresponding endwall surfaces 56, 57, and 58 when the lands 59 and 84 contact each other, thereby forming an annular intermediate pressure chamber 80 extending generally radially outwardly of the annular lands 59 and 84 between the outboard endwall 55 of the cavity 51 and the outboard axial end 77 of the outboard annular seal ring 67. At least one of the annular lands 59 and 84 can have a confronting surface which provides a leakage pathway 90 between the outboard endwall 55 of the cavity 51 and the outboard axial end 77 of the outboard seal ring 67 when the annular lands 59 and 84 are in contact with each other.

The inboard seal ring 68 has an inboard axial end 85 located adjacent to the inboard endwall 65 of the cavity 61, an outboard axial end 86 adjacent to the outboard seal ring 67, an inboard generally cylindrical surface 87 extending longitudinally between an outer portion of the inboard axial end 85 and an outer portion of an outboard facing radially extending annular shoulder 88, and an outboard generally cylindrical surface 89 extending longitudinally between an inner portion of the annular shoulder 88 and an outer portion of the outboard axial end 86, with the inboard cylindrical surface 89 being positioned adjacent to the annular sidewall surface 64 of the cavity 61.

Figure 4:
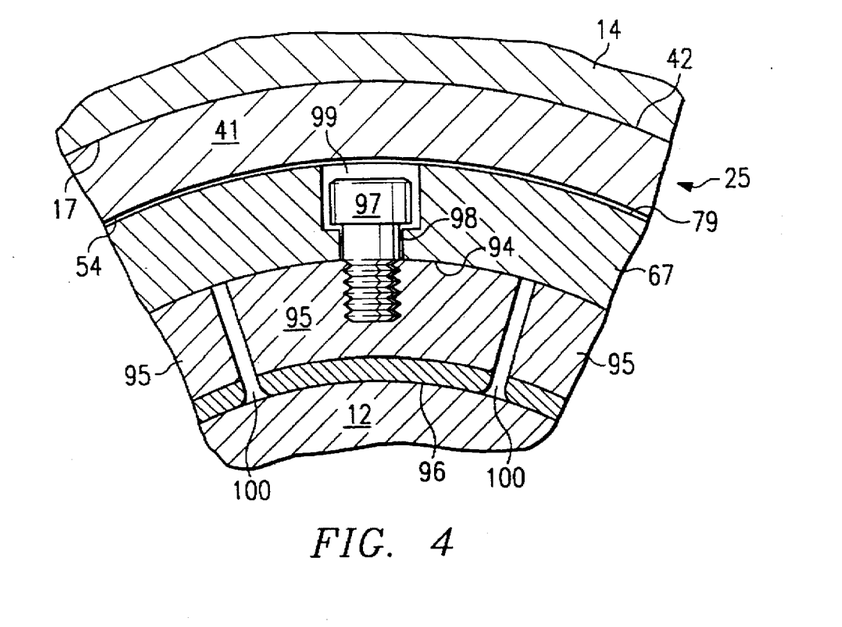
FIG. 4 is a cross-sectional view taken generally along the line 4—4 in FIG. 3.

Referring to FIGS. 3 and 4, an annular ring chamber 91 is formed in the outboard seal ring 67 surrounding and opening to the central bore 71, with the longitudinal axis of the annular chamber 91 being coaxial with the longitudinal axis 13 of the shaft 12. The annular chamber 91 extends longitudinally for an intermediate portion of the longitudinal length of the outboard seal ring 67. The annular chamber 91 has a radially extending outboard endwall surface 92, a radially extending inboard endwall surface 93, and a longitudinally extending cylindrical wall 94. A bearing is positioned within the annular ring chamber 91 for providing bearing support engagement with the shaft 12. In the illustrated embodiment, the bearing is in the form of a plurality of tilt pad bearing shoes 95. Each of the bearing shoes 95 has an inner arcuate surface 96 that is sized and arranged to slidingly mate with the radially adjacent exterior surface of the shaft 12, and each of the bearing shoes 95 is loosely connected to the outboard seal ring 67 by a threaded fastener, e.g., a bolt 97 having a shank that is loosely positioned in a radial hole 98 extending through the outboard seal ring 67 and being open to the cavity 51 in the outboard housing element 25 and to the annular chamber 91 in the outboard seal ring 67. The distal threaded end of each bolt 97 is threaded into a respective bearing shoe 95. The outer portion of the hole 98 is in the form of a counterbore 99 which has a diameter greater than the diameter of the head end of the bolt 97, while the inner portion of the hole 98 is greater than the diameter of the shank of the bolt 97 and smaller than the diameter of the head end of the bolt 97, thereby allowing the bearing shoe 95 to move relative to the outboard seal ring 67 in contacting the exterior surface of the shaft 12. The plurality of bearing shoes 95 are positioned at equally spaced locations around the circumference of the annular chamber 91, with adjacent bearing shoes 95 being spaced apart from each other by equal width gaps 100.

Each of the inner generally cylindrical surfaces 73 of the outboard seal ring 67, the inner surface 96 of the bearing shoes 95, and the inner surface 75 of the inboard seal ring 68 can be coated with a soft material, such as babbitt metal, which is suitable for rotatively sealing about the shaft 12.

Referring to FIG. 3, the inboard end 52 of the outboard annular housing element 25 can be castellated so as to provide a plurality of radially extending passages 101 alternating about the circumference of the inboard end 52 with a plurality of longitudinally extending projections 102, with the passages 101 opening onto the annular groove 18. Similarly, the inboard end 78 of the outboard seal ring 67 can be castellated so as to provide a plurality of radially extending passages 103 alternating about the circumference of the inboard end 78 with a plurality of longitudinally extending projections 104, with the passages 102 being in at least substantial radial alignment with the passages 101 in the outboard housing element 25 and in fluid communication with the inboard end portion of the annular chamber 91, thereby establishing fluid communication between annular groove 18 and annular chamber 91. The inner surfaces 105 of the longitudinally extending projections 104 have a radius from the longitudinal axis 13 which is greater than the radius of the outboard cylindrical surface portion 89 of the inboard seal ring 68 and less than the radius of the annular chamber 91, so the outboard portion of the inboard seal ring 68 can be positioned radially inwardly of the projections 104.

The inboard end of each castellated projection 102 is in abutting contact with the outboard end 62 of the inboard housing element 26, while the inboard end 106 of the inboard housing element 26 is in abutting contact with the outboard end 107 of the annular gas seal member 29, so as to press the inwardly facing annular shoulder 31 of the annular gas seal member 29 against the outwardly facing annular shoulder 32 of the casing land 22. The inboard end 78 of each castellated projection 104 of the outboard seal ring 67 is in abutting contact with the outboard facing annular shoulder 88 of the inboard seal ring 68, while the inboard end 85 of the inboard seal ring 68 is in contact with the inboard endwall 65 of the cavity 61 in the inboard housing element 26. As the longitudinal extent of the outboard portion of the inboard seal ring 68 is less than the longitudinal extent of the projections 104, the outboard axial end 86 of the inboard seal ring 68 is maintained spaced from the inboard ends of the pivot pads 95, thereby providing a passageway for the passage of high pressure lubricant from the passages 103 to the annular lubricant passageways 73 and 76. The lubricant serves to lubricate the surfaces of the shaft 12 in contact with the bearing and seal portions of the assembly 10. An O-ring 108 is positioned in an annular groove 109 formed in the inboard endwall 65 of the cavity 61, with the thickness of the O-ring 108 being such that it presses against the inboard axial end 85 of the inboard seal ring 68 to form a seal between the inboard endwall 64 of the cavity 61 and the inboard axial end 85 of the inboard seal ring 68, even when the outboard seal ring 67 and the inboard seal ring 68 are experiencing the maximum shift in the outboard direction.

The inboard seal ring 68 is pinned against rotation relative to the inboard housing element 26 by suitable means, e.g., the pin 111, which is fitted in a hole 112 in the inboard seal ring 68 and extends radially outwardly into a longitudinally extending slot 113 which is formed in the inboard annular housing element 26 so as to open to the cavity 61. The outboard seal ring 67 can be pinned against rotation relative to the outboard housing element 25 by similar means (not shown).

In the operation of the turbomachine 11, a portion of the shaft inboard of the cavity 66 is exposed to a process fluid at a process pressure $P_2$, e.g., a chamber 114 located inboard of the annular gas seal member 29, while lubricant enters the annular chamber 18 under the control of a pressure regulator (not shown) to maintain a pressure $P_1$, which is greater than the gas process pressure $P_2$ existing in chamber 114. Thus, the annular chamber 18 serves as a supply chamber for supplying lubricant under high pressure. The high pressure lubricant flows through the passages 101 in the outboard housing element 25, through the passages 103 in the outboard seal ring 67, into the annular ring chamber 91, including the gaps 100 between adjacent bearing shoes 95, and then through both of the lubricant pathways 73 and 76 between the shaft 12 and the outboard and inboard seal rings 67 and 68. The O-ring 108 prevents leakage of the high pressure lubricant between the inboard endwall of cavity 61 and the inboard axial end 85 of the inboard seal ring 68. The pressure $P_1$ against the outboard axial end 86 of the inboard seal ring 68 maintains the inboard seal ring 68 pressed against the O-ring 108. Thus, leakage of lubricant from the high pressure chamber 18 is maintained in a direction toward the process gas chamber 114 so as to prevent process gas from leaking from the process gas chamber 114 through the annular gap between the external surface of the shaft 12 and the annular sealing surface 75 of the inboard seal ring 68. Accordingly, the pressurized lubricant applies pressure against the inboard axial pressure-balance surface as well as provides a lubricant film in each of the lubricant pathways 73 and 76.

The inboard seal ring 68 is preferably a member separate from the outboard seal ring 67 in order to achieve a small size for the inboard seal ring 68 so that the inboard seal ring 68 is relatively free to float radially with the shaft 12 as the shaft 12 vibrates during the rotation of the shaft 12. This enables a fairly tight clearance fit to be maintained between the inboard seal ring 68 and the shaft 12, and as a result the amount of leakage of lubricant oil from the high pressure oil chamber 18 in the inboard direction into the process gas area 114 is minimized. Ultimately, even this minimum leakage amount of oil can be separated out in a degasser (not shown) and fed back to the high pressure oil chamber 18.

The outboard seal ring 67 functions in a somewhat different manner than the inboard seal ring 68. During operation of the turbomachine 11, the flow of lubricant oil from the annular chamber 18 in the outboard direction is basically along two paths. One is out of the cavity 51 in the outboard housing element 25 via the leakage pathway 90, and the other is through the annular lubricant pathway 76 between the external surface of the shaft 12 and the inner sealing surface 72 of the outboard seal ring 67. It is important that the flow of lubricant between the shaft 12 and the outboard seal ring 67 and out of the turbomachine 11 be maintained at a minimum level and that the leakage of lubricant between the seal ring 67 and the outboard housing element 25 through the leakage pathway 90 be kept as small as possible. Lubricant at the high pressure $P_1$ urges the outboard seal ring 67 in an axial direction toward the outboard endwall 55 of the cavity 51. The portions of the outboard axial end 77 of the outboard seal ring 67 which are located generally radially outwardly of the annular land 84 serve as an outboard axial pressure-balance surface for the outboard seal ring 67, while the portions of the inboard axial end 78 which face toward and are spaced from the inboard endwall 65 of the cavity 66 to form an annular pressure chamber between the outboard seal ring 67 and the inboard seal ring 68, i.e., the inboard facing "bottom" surfaces of the openings 103 and the portion of the inboard axial end 78 of the outboard seal ring 67 which is exposed to the high pressure lubricant, serve as an inboard axial pressure-balance surface. The lubricant at the high pressure $P_1$ acts on the inboard end balance surface, urging the outboard seal ring 67, including the annular land 84, toward the cavity endwall 55. Balancing against this and acting in the opposite direction is the intermediate lubricant pressure $P_3$ acting on the outboard end balance surface of the outboard seal ring 67. With the leakage path 90 provided across the annular lands 59 and 84, the pressure of the lubricant against the outboard end balance surface is less than $P_1$ (due to the pressure drop across the outboard seal ring 67). Thus, the area of the outboard end balance surface is chosen to be substantially greater than the area of the inboard end balance surface so that the resulting outboard directed force substantially equals the resulting inboard directed force. The leakage of lubricant between the annular land 84 of the outboard seal ring 67 and the annular land 59 on the cavity endwall 55 is substantially limited so as to ensure an adequate supply of lubricant along the annular lubricant pathway 73 between the inner sealing surface 72 of the outboard seal ring 67 and the external surface of the shaft 12.

An eccentric O-ring oil film damper system 121 for supporting the shaft 12 in a centered position in the casing bore 15 is provided between the outboard seal ring 67 and the outboard housing element 25. As a result of these structural features, the bearing support provided by the tilt pad bearing shoes 95 is sufficient to provide the entire bearing support needed for this end of the shaft 12, thereby eliminating the need for any additional bearing support outboard of the outboard seal ring 67. Moreover, this is accomplished with lower lubricant leakage losses from the housing, while continuing to maintain and insure that a sufficient lubricant flow exists through the leakage pathway 90 to keep from fretting the surface of the annular lands 59 and 84.

Figure 6A:
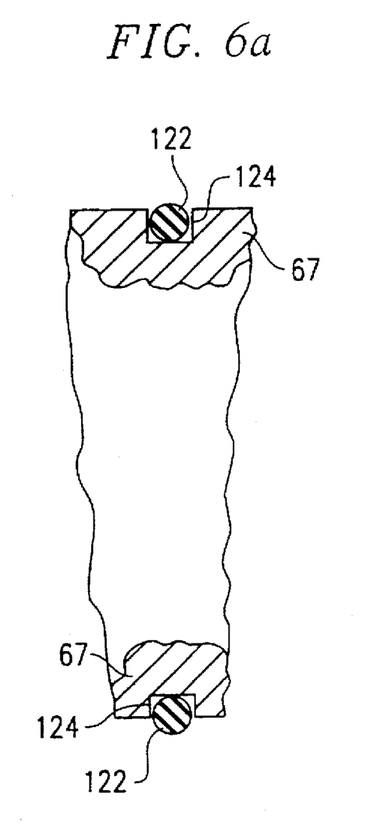
FIGS. 6a and 6b are respective partial cross-sectional side and end views of the outboard seal ring, showing the eccentric O-ring groove formed therein.
Figure 6B:
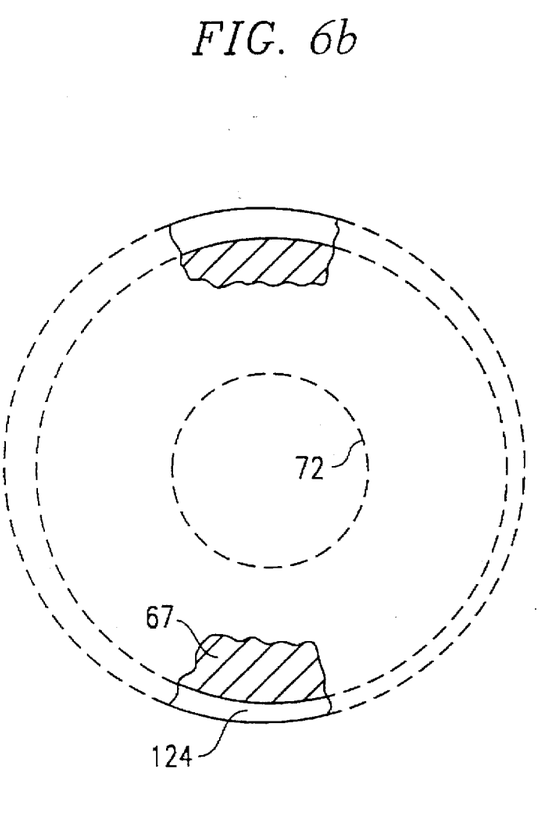

The squeeze film damper system 121 includes axially spaced annular members 122 and 123 which are formed of resilient material, e.g., O-rings, and have a circular configuration with respect to their longitudinal axis. The O-rings 122 and 123 are positioned in annular grooves 124 and 125, respectively, which are formed in the annular outer surface 79 of the outboard seal ring 67 so as to be spaced apart from each other along the longitudinal axis of the outboard seal ring 67, so that each O-ring 122 and 123 contacts the sidewall surface 54 of the cavity 51. While each of the annular O-ring grooves 124 and 125 is circular with respect to its longitudinal axis, the longitudinal axis of each of the grooves 124 and 125 is parallel to and spaced from the longitudinal axis of the central bore 71 of the outboard seal ring 67 so that the grooves 124 and 125 are eccentric in configuration relative to the central bore 71. Each of the grooves 124 and 125 includes an upper (above the horizontal centerline of the shaft 12) portion which has a deeper groove depth than the lower (below the horizontal centerline of the shaft 12) portion. As a result, when an O-ring is placed in each groove, the amount of O-ring material protruding radially away (generally downwardly) from the seal ring 67 along the lower portion of the outer surface 79 of the outboard seal ring 67 is greater than the amount of O-ring material protruding (generally upwardly) from the top of the outer surface 79 of the outboard seal ring 67. This differential amount of protruding material is chosen such that the static weight of the shaft 12 will be supported by the greater amount of protruding material beneath the shaft 12 sufficiently to cause the shaft 12 to be centered within the casing bore 15 and the annular cavity 51. Within the cavity 51, the O-rings 122 and 123 are squeezed between the annular longitudinally extending sidewall 54 of the outboard annular housing element 25 and the bottoms of the annular but eccentric grooves 124 and 125. The concentricity of the outboard seal ring 67 with the housing cavity 51 is sought in order to enable the desired squeeze film damping effect.

An annular squeeze film chamber 131 is defined radially by the annular sidewall surface 54 of the cavity 51 and the outer annular surface 79 of the outboard seal ring 67 and axially by the O-rings 122 and 123 for containing an oil film to function as a damper against lateral movement of the shaft 12 during operation of the turbomachine 11. Lubricant oil at a high pressure $P_1$ is supplied to the annular chamber 131 by way of a flow passage 132 which extends through the outboard housing element 25 from one of the radial passageways 101 to an opening 133 in the inner annular sidewall 54 at a location between the two O-rings 122 and 123, and thus into the annular chamber 131. Each counterbore 99 opens into the annular chamber 131, so that the high pressure oil in the annular chamber 131 biases each bolt 97 and pivot pad 95 toward the shaft 12. A lateral motion of the annular seal ring 67 exerts a compressive or squeezing force on the lubricant in the annular squeeze film chamber 131, thereby generating a damping resistance to lateral movement, e.g., vibratory motion of the annular seal ring 67 and the shaft 12.

The annular intermediate pressure balancing chamber 80 is located within the cavity 51 outboard of the outermost one of the O-rings 122 and 123, so that the O-ring 122 provides a seal between the squeeze film chamber 131 and the intermediate pressure balancing chamber 80. However, the intermediate oil pressure $P_3$ existing within the chamber 80 is achieved by supplying oil through an oil supply passage 134, which is formed in the outboard seal ring 67 and communicates with the high pressure oil existing in the gaps 100 between the tilt pad bearing shoes 95. A flow restricting orifice 135 connects the outboard end of the supply passage 134 to the intermediate pressure chamber 80, and is sized to limit the flow of lubricating oil into the intermediate pressure chamber 80. The cross-sectional area of the flow control orifice 135 is substantially less than the cross-sectional area of the annular lubricant pathway 73 by a factor of ten or so. With this construction, the lubricant flow through the leakage pathway 90 between the annular lands 59 and 84 is limited to the flow through the orifice 135, because, as the pressure $P_3$ in the chamber 80 begins to approach the pressure $P_1$, the outboard seal ring 67 tends to shift to the right (as viewed in FIG. 3) causing the leakage path 90 to enlarge and some of the pressure $P_3$ to be vented. The decrease in pressure $P_3$ occurs fairly quickly because the restriction of the orifice 135 limits the rate of flow into the chamber 80. As the difference in pressures between $P_1$ and $P_3$ increases ($P_3$ being less), the outboard seal ring 67 is caused to shift toward the left by the relatively higher pressure $P_1$, thus reducing the leakage path 90. Advantageously, the leakage pathway 90 will not close entirely because the balancing area of the intermediate pressure chamber 80 is larger than the balancing area of the inboard end portion of the outboard seal ring 67 which is subject to the high pressure oil $P_1$. Thus, a continuous but small flow of oil is maintained between the two adjacent surfaces of the annular lands 59 and 84. Because of this continual flow, contact of the adjacent surfaces of the annular lands 59 and 84 is avoided, and thus the fretting of these adjacent surfaces is also avoided.

In defining the intermediate balancing chamber 80, the outboard end portion of the outboard seal ring 67 includes a portion 136 which extends generally outboardly and radially inwardly so as to fit within a step in the shaft 12 having a reduced diameter. As a result, the annular area of the outboard end balance surface of the outboard seal ring 67 is larger than the area of the inboard end balance surface of the outboard seal ring 67, so that the outboard seal ring 67 is axially balanced within the cavity 51 at a pressure $P_3$ in the pressure chamber 80 which is less than the supply pressure $P_1$. As the outboard seal ring 67 is substantially balanced axially, it is relatively free to float radially on the lubricant existing within the leakage pathway 90 and the lubricant passing from the passageways 103 into the spaces between the inboard seal ring 68 and the outboard seal ring 67. Thus, the outboard seal ring 67 can readily move in a radial direction with any eccentric movement of the shaft 12. Accordingly, the squeeze film damper system 121, provided by the eccentric O-ring grooves 124 and 125, O-rings 122 and 123, and the high pressure oil in annular chamber 131, is fully functional and uninhibited by any substantial frictional engagement of any of the radial surfaces of the outboard seal ring 67 with any other member.

Figure 5:
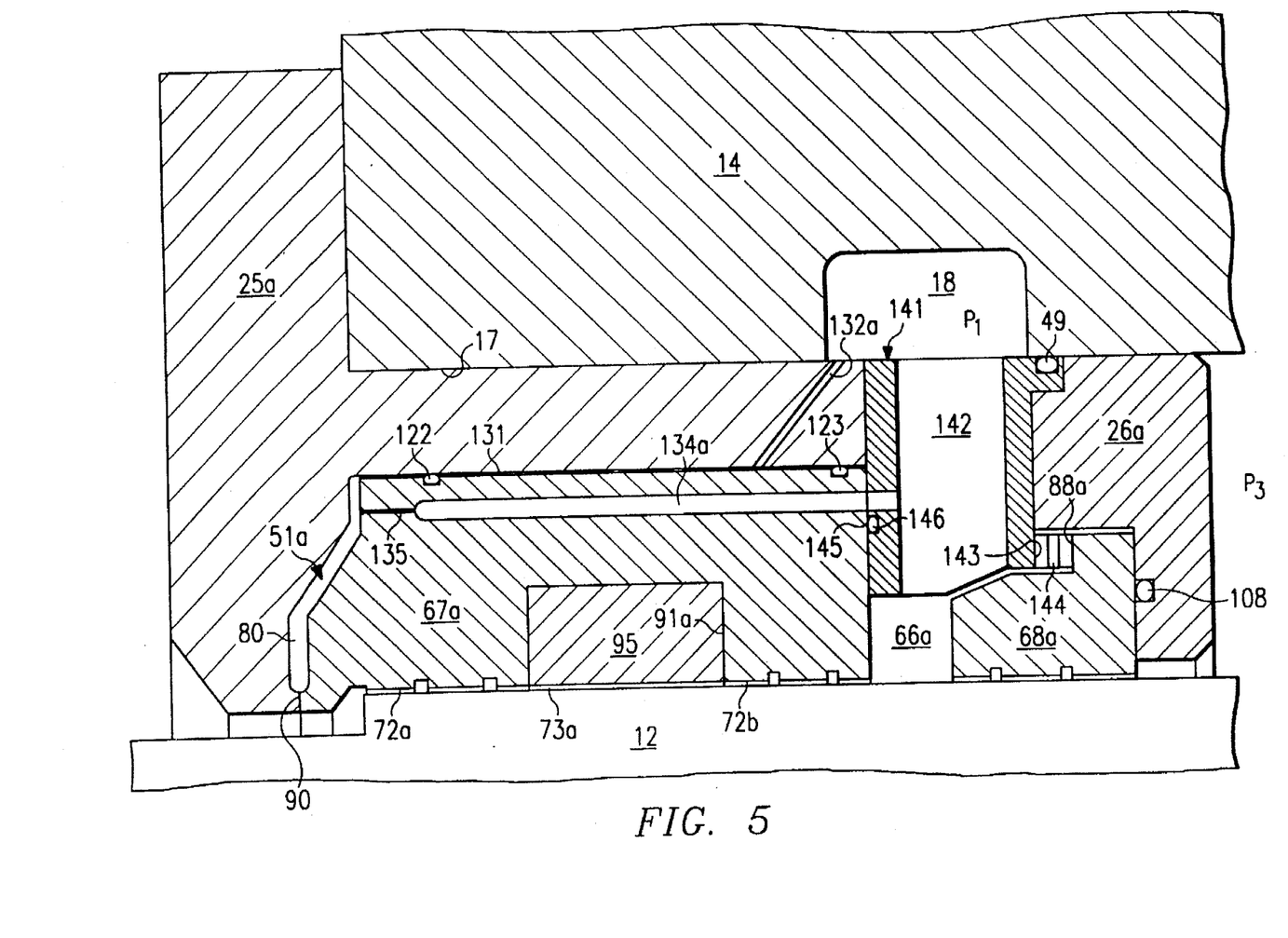
FIG. 5 depicts a portion of a turbomachine, including a combined bearing support and seal structure assembly for one end of the rotatable shaft of the turbomachine, constructed in accordance with a second embodiment of the present invention, viewed as a radial cross section in a plane which includes the longitudinal axis of the rotatable shaft.

An alternate embodiment of the present invention is illustrated in FIG. 5, wherein the components which are the same as in the embodiment illustrated in FIGS. 2 and 3 have the same reference numerals as utilized in the description of FIGS. 2 and 3, and a detailed description thereof is not repeated. The reference numbers for elements which have been modified have a letter suffix.

The outboard seal ring 67a differs from the outboard seal ring 67 in that the inboard end portion of the outboard seal ring 67a does not contain the castellated passages and projections, and has an internal diameter which is only slightly greater than the diameter of the adjacent portion of the shaft 12. Thus, the outboard seal ring 67a has two annular longitudinally extending sealing surfaces 72a and 72b located adjacent the exterior surface of the shaft 12 so as to define an annular lubricant pathway 73a between each of the annular sealing surfaces 72a and 72b and the radially adjacent portion of the shaft 12. Therefore, an annular sealing surface exists inboard of the tilt pad bearing shoes 95 as well as outboard of the tilt pad bearing shoes 95. The O-rings 122 and 123 are positioned symmetrically on each side of the center of the tilt pad shoes 95, which allows the O-rings 122 and 123 to carry rotor weight equally. The passageway 132a has one end opening directly into the annular groove 18 while the other end opens into the annular squeeze film chamber 131.

A fixed spacer ring 141 is captured between the outboard housing element 25a and the inboard housing element 26a, and extends radially inwardly between the outboard seal ring 67a and the inboard seal ring 68a. The spacer ring 141 includes a plurality of radially extending passages 142 (only one of which is shown in FIG. 5) providing fluid communication between the annular groove 18 and the annular chamber 66a. The spacer ring 141 includes a radially inner end portion 143 which extends into the cavity 61a and serves as an abutment shoulder for an annular wave spring 144. The spring 144 acts between the spacer ring 141 and the outboardly facing annular shoulder 88a on the inboard seal ring 68a to urge the inboard seal ring 68a into engagement with the O-ring 108. This arrangement allows the outboard seal ring 67a and the inboard seal ring 68a to move radially completely independent from each other, since no axial forces are transmitted from one seal ring to the other seal ring.

The lubricant supply passage 134a is formed in the spacer ring 141 and in the outboard seal ring 67a parallel to the longitudinal axis of the outboard seal ring 67a, so as to provide fluid communication between a radial passage 142 and the intermediate pressure chamber 80 via the flow restriction 135, without including the annular chamber 91a. An O-ring 145 is positioned in an annular groove 146 formed in the outboard end of the spacer ring 141 radially inwardly from the inlet to the passageway 134a. With this arrangement, a predetermined amount of squeeze is applied to the O-ring 108 regardless of the pressure differential existing between the high pressure oil $P_1$ and the process gas pressure $P_2$. Generally, the operation of the embodiment of FIG. 5 is similar to that of the embodiment of FIGS. 2 and 3, particularly with respect to the balancing of the outboard seal ring 67a within the cavity 51a and the regulation of the leakage flow of lubricant through the leakage pathway 90.

Thus, it is seen from the foregoing that the present invention brings to the art a new and improved combination support bearing and seal assembly 10 which utilizes the flow restriction 135 to provide for reduced leakage of lubricant oil through the annular gap between the annular housing element 25 and the shaft 12. The integrated combination of the flow restriction 135 for promoting the axial balancing of the outboard seal ring 67 to permit relatively free radial movement of the outboard seal ring 67, the load carrying capability of the O-rings 122 and 123 in the eccentric grooves 124 and 125 of the liquid film damper system 121, the tilting pads for positioning of the shaft 12 in the outboard seal ring 67, and the damping capability of the oil in the squeeze film damper chamber 131 transforms a troublesome necessity of sealing the turbomachine 11 into a well-behaved bearing, enabling the tilt bearing pad shoes 95 to be the sole support for one end of the shaft 12 of the turbomachine 11. Accordingly, the need for additional bearing support outboard of the seal ring 67 is eliminated. The rotor system stiffness and damping coefficients are comparable to turbomachines with conventional separate journal bearings outboard of the seal.

Advantages of the invention include shorter bearing spans, reduced total oil flow, lower total power losses, fewer piping connections, fewer total components, and shorter rotors. The invention also allows the possibility of reduced thickness of casing heads and larger shaft diameters at a coupling.

Reasonable variations and modifications of the invention are possible within the scope of the foregoing disclosure and the appended claims to the invention. For example, while the invention has been illustrated with the eccentric grooves 124 and 125 being in the external surface of the outboard annular seal 67, these grooves could be formed in the internal surface 54 of the outboard housing element 25. Similarly, while the invention has been illustrated with two annular lands 59 and 84 forming the leakage pathway 90, a single annular land can be employed and it can be on either the endwall 55 or the endwall 77. While in the illustrated embodiment, the inboard end of the outboard seal ring 67 faces the outboard end of the inboard seal ring 68 as well as the inboard endwall 65 of the collective cavity 66 in order to form an annular pressure chamber between the outboard seal ring 67 and the inboard seal ring 68, the inboard seal ring 68 can be omitted such that the annular pressure chamber is formed between the inboard end of the outboard seal ring 67 and the inboard endwall 65 of the collective cavity 66.

That which is claimed is:

1. A turbomachine comprising:

a rotatable shaft having a longitudinal axis;

a housing having a housing bore therein for receiving said rotatable shaft so that the longitudinal axis of said rotatable shaft is at least generally parallel to a longitudinal axis of said housing bore; said housing having an annular cavity formed therein encircling said housing bore and open to said housing bore; said cavity being defined by an outboard endwall, an inboard endwall axially spaced from said outboard endwall, and an annular sidewall extending generally longitudinally between said outboard endwall and said inboard endwall; a portion of said rotatable shaft inboard of said cavity being adapted to be exposed to a process fluid at a first pressure;

a first annular seal ring mounted within said cavity and having a longitudinal axis which is generally parallel to the longitudinal axis of said housing bore; said first annular seal ring having an outboard axial end, an inboard axial end, and an outer annular surface extending generally longitudinally between said outboard axial end and said inboard axial end; said outer annular surface being adjacent to said annular sidewall of said cavity; said outboard axial end of said first annular seal ring being adjacent to said outboard endwall of said cavity;

an annular land formed on one of said outboard endwall of said cavity and said outboard axial end of said first annular seal ring so as to provide a leakage pathway between said outboard endwall of said cavity and said outboard axial end of said first annular seal ring; said outboard axial end of said first annular seal ring having an outboard axial pressure-balance surface located generally radially outwardly of said annular land and facing toward and spaced from said outboard endwall of said cavity to thereby define a first annular pressure chamber extending generally radially outwardly of said annular land; said outboard axial pressure-balance surface being of a first area;

said inboard axial end of said first annular seal ring having an inboard axial pressure-balance surface facing toward and spaced from said inboard endwall of said cavity to form a second annular pressure chamber; said inboard axial pressure-balance surface being of a second area; said first area being greater than said second area;

said first annular seal ring having a first central bore formed therethrough along the longitudinal axis of said first annular seal ring; said first central bore having a longitudinal axis; said first central bore being sized to rotatably receive said rotatable shaft with the longitudinal axis of said rotatable shaft being at least substantially coaxial with the longitudinal axis of said first central bore; said first annular seal ring having an radially inner annular longitudinally extending sealing surface adjacent to said rotatable shaft so as to define a first annular lubricant pathway between said inner annular sealing surface and said rotatable shaft;

said first annular seal ring having an annular ring chamber formed around said first central bore and open to said first central bore for a portion of a longitudinal length of said first annular seal ring; a bearing mounted in said annular chamber for providing bearing support engagement with said rotatable shaft;

first and second annular grooves and first and second annular members of resilient material; each of said first and second annular members being positioned in a respective one of said first and second annular grooves; each of said first and second annular grooves being formed in one of said annular sidewall of said cavity and said outer annular surface of said first annular seal ring at locations which are spaced apart from each other along the longitudinal axis of said first annular seal ring so that each annular member contacts the respective other of said annular sidewall of said cavity and said outer annular surface of said first annular seal ring to thereby form an annular squeeze film chamber defined radially by said annular sidewall of said cavity and said outer annular surface of said first annular seal ring and axially by the thus spaced apart annular members, whereby lubricant in said annular squeeze film chamber damps lateral movement of said rotatable shaft;

a supply chamber formed in said housing for supplying lubricant at a second pressure which is higher than said first pressure;

a first passageway for passing lubricant, received from said supply chamber, to said second annular pressure chamber, to thereby apply pressure against said inboard axial pressure-balance surface, and to said first annular lubricant pathway, to thereby provide lubricant between said rotatable shaft and said inner annular longitudinally extending sealing surface of said first annular seal ring;

a second passageway for passing lubricant, received from said supply chamber, to said first annular pressure chamber to provide a fluid pressure in said first annular pressure chamber, to thereby apply pressure against said outboard axial pressure-balance surface and to provide an outflow of lubricant through said leakage pathway with said first annular seal ring being at least substantially balanced axially by pressure forces acting on said outboard axial pressure-balance surface and said inboard axial pressure-balance surface so that said first annular seal ring can move laterally with said rotatable shaft when said rotatable shaft moves laterally; and a third passageway for passing lubricant, received from said supply chamber, to said annular squeeze film chamber to damp lateral movement of said rotatable shaft.

2. A turbomachine in accordance with claim 1, wherein said bearing comprises a plurality of tilt pads, each of said tilt pads having an inner arcuate surface; said tilt pads being positioned in said annular ring chamber and loosely connected to said first annular seal ring, whereby the inner arcuate surface of each of said tilt pads can engage said rotatable shaft so as to tend to maintain said first annular seal ring at least substantially coaxial with said rotatable shaft.

3. A turbomachine in accordance with claim 2, wherein each of said tilt pads is loosely connected to said first annular seal ring by a respective bolt having a head and a shank with a threaded distal end, wherein the shank extends through an opening in said first annular seal ring with the threaded distal end being secured in the respective tilt pad and the head of the bolt being positioned in a counterbore for said opening in said first annular seal ring, the diameter of said opening in said first annular seal ring being greater than a diameter of the shank and smaller than a diameter of the head, whereby the bolt and the associated tilt pad can move radially to a limited extent with respect to said first annular seal ring, and wherein said counterbore is open to said annular squeeze film chamber so that lubricant in said annular squeeze film chamber biases the bolts and tilt pads toward said rotatable shaft.

4. A turbomachine in accordance with claim 1, wherein said second passageway includes a flow limiter for limiting a flow rate of lubricant through said second passageway to said first annular pressure chamber, whereby the pressure in said first annular pressure chamber is varied in accordance with the rate of outflow of fluid through said leakage pathway.

5. A turbomachine in accordance with claim 4, wherein said flow limiter comprises a restrictive passage having a cross-sectional area substantially less than a cross-sectional area of said first annular lubricant pathway.

6. A turbomachine in accordance with claim 1, wherein each of said first and second annular grooves has a longitudinal axis which is parallel to and spaced from the longitudinal axis of said first annular seal ring so that each of said first and second annular grooves is eccentric to said first annular seal ring.

7. A turbomachine in accordance with claim 1, wherein each of said first and second annular grooves has a longitudinal axis which is parallel to and spaced from the longitudinal axis of said first annular seal ring; and wherein each of said first and second annular grooves has a top portion located above said rotatable shaft and a bottom portion located below said rotatable shaft, each bottom portion having a groove depth which is less than a groove depth of the top portion of the respective groove; whereby each of said first and second annular members of resilient material has more material protruding out of the bottom portion of the associated groove than out of the top portion of the associated groove, to thereby support the weight of said rotatable shaft sufficiently to cause said rotatable shaft to be centered within said cavity.

8. A turbomachine in accordance with claim 7, wherein each of said first and second annular members of resilient material has a circular configuration with respect to its longitudinal axis.

9. A turbomachine in accordance with claim 7, wherein each of said first and second annular grooves is formed in said outer annular surface of said first annular seal ring.

10. A turbomachine in accordance with claim 9, wherein said bearing comprises a plurality of tilt pads, each of said tilt pads having an inner arcuate surface; said tilt pads being positioned in said annular ring chamber and loosely connected to said first annular seal ring, whereby the inner arcuate surface of each of said tilt pads can engage said rotatable shaft so as to tend to maintain said first annular seal ring at least substantially coaxial with said rotatable shaft.

11. A turbomachine in accordance with claim 10, wherein each of said tilt pads is loosely connected to said first annular seal ring by a respective bolt having a head and a shank with a threaded distal end, wherein the shank extends through an opening in said first annular seal ring with the threaded distal end being secured in the respective tilt pad and the head of the bolt being positioned in a counterbore for said opening in said first annular seal ring, the diameter of said opening in said first annular seal ring being greater than a diameter of the shank and smaller than a diameter of the head, whereby the bolt and the associated tilt pad can move radially to a limited extent with respect to said first annular seal ring, and wherein said counterbore is open to said annular squeeze film chamber so that lubricant in said annular squeeze film chamber biases the bolts and tilt pads toward said rotatable shaft.

12. A turbomachine in accordance with claim 1, wherein said second passageway extends from said second annular pressure chamber through said first annular seal ring to said first annular pressure chamber.

13. A turbomachine in accordance with claim 1, wherein said second passageway extends from said second annular pressure chamber through said annular ring chamber and then through said first annular seal ring to said first annular pressure chamber.

14. A turbomachine in accordance with claim 1, wherein an inboard end portion of said first annular seal ring is castellated to form a plurality of radially extending passageways which constitute at least a portion of said first passageway.

15. A turbomachine in accordance with claim 1, further comprising:

an inboard annular seal ring mounted within said cavity generally inboard of said first annular seal ring and adjacent the inboard endwall of said cavity; said inboard annular seal ring including an outboard axial end, an inboard axial end adjacent said inboard endwall of said cavity, and a center bore extending therethrough along a longitudinal axis of said inboard annular seal ring and sized to rotatably receive said rotatable shaft; said second annular pressure chamber being between an inboard portion of said first annular seal ring and an outboard portion of said inboard annular seal ring; the center bore of said inboard annular seal ring defining a second inner annular longitudinally extending sealing surface adjacent to said rotatable shaft so as to define a second annular lubricant pathway between said second sealing surface and said rotatable shaft; and an annular seal positioned between said inboard axial end of said inboard annular seal ring and said inboard endwall of said cavity to prevent lubricant from flowing radially therebetween;

wherein said first passageway provides a lubricant flow path for lubricant, received from said supply chamber, to said second annular lubricant pathway.

16. A turbomachine in accordance with claim 15, wherein said inboard axial end of said first annular seal ring is spaced longitudinally from said outboard axial end of said inboard annular seal ring to thereby provide said second annular pressure chamber; and further comprising an annular spacer ring positioned between an inboard end portion of said first annular seal ring and a portion of said inboard annular seal ring; said annular spacer ring having at least one passage extending generally radially therethrough as part of said first passageway.

17. A turbomachine in accordance with claim 16, further comprising a spring member acting between said inboard annular seal ring and said annular spacer ring to urge said inboard annular seal ring toward said annular seal.

18. A turbomachine in accordance with claim 17, wherein said spring member is a wave spring.

19. A turbomachine in accordance with claim 1, wherein said inner annular longitudinally extending sealing surface comprises a first sealing surface section and a second sealing surface section longitudinally spaced apart from each other, said annular ring chamber being formed in said first annular seal ring at a location longitudinally between said first and second sealing surface sections.

20. A turbomachine in accordance with claim 1, wherein said rotatable shaft has first and second longitudinal sections, with said first longitudinal section having a smaller diameter than said second longitudinal section; wherein said first annular lubricant pathway is formed between said second longitudinal section and said first annular seal ring; and wherein said housing and an outboard end portion of said first annular seal ring extend radially inwardly toward said first longitudinal section in order to increase the area of said outboard axial pressure-balance surface.

21. A turbomachine comprising:

a rotatable shaft;

a housing having an internal cavity bounded by an annular inner surface that extends axially with respect to said shaft, and an outboard endwall surface;

a seal ring for sealing to said shaft and axially moveable on said shaft, said seal ring having an outboard endwall spaced from the outboard endwall surface of said housing to define a first pressure balance chamber carrying a lubricant, said seal ring further including an inboard endwall defining a portion of a second pressure balance chamber against which the lubricant is forced;

a lubricant chamber containing a pressurized lubricant for communicating the lubricant to said first and second pressure balance chambers;

a portion of said outboard endwall surface of said housing and a portion of said outboard endwall of said seal ring defining a leakage pathway for restricting leakage of the lubricant therethrough as a function of the axial movement of said seal ring with respect to said housing; and wherein said seal ring is axially balanced by a lubricant pressure acting on said outboard endwall and inboard endwall thereof, and wherein an axial movement of said seal ring in a direction away from the outboard endwall surface of said housing enlarges said lubricant leakage pathway to thereby lower the pressure in said first pressure balance chamber and reduce the axial movement of said seal ring in said direction away from said housing outboard endwall surface.

22. A turbomachine, in accordance with claim 21, further including a flow restriction orifice for supplying a lubricant to said first pressure balance chamber, and wherein a cross-sectional area of said flow restriction orifice is substantially less than a cross-sectional area of said leakage pathway, and said flow restriction orifice provides the lubricant to said first pressure balance chamber.

23. A turbomachine in accordance with claim 21, wherein said leakage pathway remains open during operation of the turbomachine to thereby provide the lubricant between said shaft and said seal ring.

* * * * *

UNITED STATES PATENT AND TRADEMARK OFFICE
CERTIFICATE OF CORRECTION

PATENT NO.   : 5,738,356
DATED        : April 14, 1998
INVENTOR(S)  : Dale Fred Marshall It is certified that error appears in the above-identified patent and that said Letters Patent is hereby corrected as shown below:

On the title page, insert:
--[75]Assignee: Dresser-Rand Company, Corning, New York--.

Signed and Sealed this

Twentieth Day of July, 1999

Attest:

Q. TODD DICKINSON

Attesting Officer

Acting Commissioner of Patents and Trademarks